United States Patent
Li et al.

(10) Patent No.: US 11,591,762 B2
(45) Date of Patent: Feb. 28, 2023

(54) METHOD FOR TRACKING, MONITORING AND EVALUATING ECOLOGICAL IMPACT OF CHANNEL PROJECT BASED ON LONG-TERM TIME SERIES SATELLITE REMOTE SENSING DATA

(71) Applicant: China Waterborne Transport Research Institute, Beijing (CN)

(72) Inventors: Jinpeng Li, Beijing (CN); Bing Qiao, Beijing (CN); Mingbo Chen, Beijing (CN); Shiyue Wang, Beijing (CN); Yue Li, Beijing (CN); Xueyuan Ji, Beijing (CN); Xuan Wu, Beijing (CN); Chunling Liu, Beijing (CN)

(73) Assignee: China Waterborne Transport Research Institute, Beijing (CN)

( * ) Notice: Subject to any disclaimer, the term of this patent is extended or adjusted under 35 U.S.C. 154(b) by 386 days.

(21) Appl. No.: 16/822,505

(22) Filed: Mar. 18, 2020

(65) Prior Publication Data
US 2020/0311842 A1 Oct. 1, 2020

(30) Foreign Application Priority Data
Mar. 28, 2019 (CN) .......................... 201910240238.4

(51) Int. Cl.
*E02B 1/02* (2006.01)
*E02B 3/12* (2006.01)
(Continued)

(52) U.S. Cl.
CPC ................. *E02B 1/02* (2013.01); *E02B 3/12* (2013.01); *G06Q 50/08* (2013.01);
(Continued)

(58) Field of Classification Search
CPC .. E02B 1/02; E02B 3/12; G06Q 50/02; G06Q 50/08
See application file for complete search history.

(56) References Cited

U.S. PATENT DOCUMENTS

2009/0076632 A1* 3/2009 Kram .................. G06Q 10/063
700/33

FOREIGN PATENT DOCUMENTS

CN 101021062 A * 8/2007
CN 104268560 A 1/2015
(Continued)

OTHER PUBLICATIONS

Chao Sun, "Dynamic Monitoring of Oil/Gas Development in the South China Sea Based on Long-Period Time-Series and Multi-Source Remote Sensing Images", Nanjing University, School of Geographic and Oceanographic Sciences, May 2018. With English abstract. Part 1, Part 2 and Part 3.
(Continued)

*Primary Examiner* — Frederick L Lagman
(74) *Attorney, Agent, or Firm* — Cooper Legal Group, LLC

(57) ABSTRACT

The present invention relates to a method for tracking, monitoring and evaluating ecological impacts of a channel project based on long-term time series satellite remote sensing data, belonging to the field of ecological environment protection. Created in view of limitations and deficiencies of existing monitoring and evaluation methods, the method includes: a process for long-term time series satellite remote sensing analysis of an ecological impact of a channel project, an analysis method for respectively evaluating erosion and deposition, shoreline and water area morphological changes at different research scales based on water body information extraction, and an analysis method for respectively tracking and monitoring engineering construction
(Continued)

details, comparing engineering impact scope consistency and evaluating engineering implementation effects based on channel project identification.

3 Claims, 5 Drawing Sheets

(51) Int. Cl.
    *G06Q 50/08*     (2012.01)
    *G06Q 10/0639*     (2023.01)
    *G06Q 30/018*     (2023.01)
    *G06Q 50/26*     (2012.01)

(52) U.S. Cl.
    CPC ..... *G06Q 10/06393* (2013.01); *G06Q 30/018* (2013.01); *G06Q 50/26* (2013.01)

(56) References Cited

FOREIGN PATENT DOCUMENTS

| CN | 106896192 A | * | 6/2017 | ............. G01N 33/18 |
| CN | 107423564 A | * | 12/2017 | |
| CN | 107764963 A | * | 3/2018 | ............. G01N 33/18 |

OTHER PUBLICATIONS

Xu Ling, "Remote Sensing and Channel Evolution Analysis of the Mainstream of the Lower Minjiang River", Chinese Master's Thesis Full Text Database, No. S1, 2011, Information Science and Technology. With English Abstract.

Chu Zhongxin, "Study on the Evolution and Erosion and Deposition of the Modern Yellow River Delta and Application of Remote Sensing", Jun. 2003, Masters Degree Thesis, Ocean University of China. With English Abstract.

* cited by examiner

METHOD FOR TRACKING, MONITORING AND EVALUATING ECOLOGICAL IMPACT OF CHANNEL PROJECT BASED ON LONG-TERM TIME SERIES SATELLITE REMOTE SENSING DATA

RELATED APPLICATION

This application claims the benefit of priority from Chinese Patent Application No. 201910240238.4, filed on Mar. 28, 2019. The content of the aforementioned application, including any intervening amendments thereto, is incorporated herein by reference in its entirety.

TECHNICAL FIELD

The present invention relates to a method for tracking, monitoring and evaluating an ecological impact of a channel project based on long-term time series satellite remote sensing data, belonging to the field of ecological environment protection technologies.

BACKGROUND

Channel projects feature a large spatial scope and long time span for construction and operation maintenance, which correspondingly causes changes of habitat conditions such as water flow and shoreline with time and space. It is expectedly a feasible and cost-effective technical approach to track and monitor the large-scale and long-term ecological impact of channel projects by using long-term time series satellite remote sensing data. This approach urgently needs to be supported by applicable tracking, monitoring and evaluation methods.

Related research shows that the utilization of satellite remote sensing information still depends on the establishment of a special remote sensing data identification method and is based on accurate ground object information investigation. For example:

Wang Wei and Ling Huanran disclosed in patent CN104268560A, 2015 a land use identification method based on remote sensing interpretation. The method adopts a 13-characteristic method in pattern recognition to perform template sampling and matching detection of multi-sample raster data, and realizes the identification of a land use status of a whole research area on the basis of mastering accurate land use mapping classification of a research area. This brings great convenience for obtaining effective and complete data.

Xu Jing used a remote sensing technology, took Landsat remote sensing data of the United States as an example to establish a remote sensing inversion model of Minjiang River water depth with reference to measured underwater topographic data, and introduced sediment remote sensing parameters suitable for a second class of water bodies, to establish a water depth model of the lower Minjiang River mainstream (Master's degree thesis of Fujian Normal University, *Remote Sensing of Water Depth and Analysis of River Morphology Evolution in the Lower Minjiang River Mainstream*, April 2009).

Chu Zhongxin used a remote sensing technology to study the law of erosion and deposition in the Yellow River Delta based on Landsat remote sensing data from 1976 to 2000 in the Yellow River Delta with reference to measured 2 m isobath data and data of water and sediment of the Yellow River entering the sea, thus realizing multispectral remote sensing water depth inversion of high turbidity water areas (Masters degree thesis of Ocean University of China, *Study on Evolution Law of Erosion and Deposition in Modern Yellow River Delta and Application of Remote Sensing*, June 2003).

Sun Chao integrated long-term time series multi-source remote sensing image data sets, and performed monitoring research on oil and gas development activities in the South China Sea to propose a method for analyzing marine oil and gas development activities (doctoral dissertation of Nanjing University, *Monitoring Research on Oil and Gas Development Activities in the South China Sea Supported by Long-term time series Multi-source Remote Sensing Images*, May 2018).

In summary, the existing research on satellite remote sensing monitoring has the following limitations and deficiencies:

(1) It is required to establish a special method for remote sensing data identification of land use, water depth and marine oil and gas development activity conditions, and the identification method lacks universality because it relies on measured data according to which the foregoing conditions have been mastered.

(2) It is mainly used to obtain information on land use conditions and water depth, as well as information on human activity conditions in marine oil and gas development. The information cannot be directly used to evaluate the ecological impact of channel projects and related human activity conditions. There is a corresponding gap in data acquisition types.

(3) A land use matching detection method, a method for analyzing oil and gas development activities by using multi-source remote sensing images, and a method for remote sensing inversion of water depths in specific and high turbidity water areas have been developed. Although they improve the accessibility and efficiency of data acquisition, they cannot be directly used to evaluate the ecological conditions of channel project water areas and the impact of related human activities. There are corresponding technical gaps in remote sensing monitoring and evaluation methods.

SUMMARY (1) Invention Objectives

In view of the limitations and deficiencies of existing ecological environment satellite remote sensing monitoring research, the present invention provides a method for tracking, monitoring and evaluating an ecological impact of a channel project based on long-term time series satellite remote sensing data. The method includes: a process for long-term time series satellite remote sensing analysis of an ecological impact of a channel project, an analysis method for respectively evaluating erosion and deposition, shoreline and water area morphological changes at different research scales based on water body information extraction, and an analysis method for respectively tracking and monitoring engineering construction details, comparing engineering impact scope consistency and evaluating engineering implementation effects based on channel project identification. The extraction of water body information does not depend on the control and inversion of measured data, and visually identifiable targets are selected for the channel project identification, thus providing a suitable, simple, feasible and economical satellite remote sensing tracking, monitoring and evaluation technical support for long-term tracking and monitoring of an ecological impact of a channel project, evaluation of an ecological environment effect of project implementation, and evaluation of effectiveness and ecological rationality of project design.

(2) Technical Solutions

To solve the technical problem, the present invention adopts the following technical solution: a method for tracking, monitoring and evaluating an ecological impact of a channel project based on long-term time series satellite remote sensing data, including a process for long-term time series satellite remote sensing analysis of an ecological impact of a channel project, a method for evaluating ecological impacts of a channel project at different research scales based on water body information extraction, and a method for tracking, monitoring and evaluating construction details and implementation effects based on channel project identification.

The process for long-term time series satellite remote sensing analysis of an ecological impact of a channel project includes four levels of analysis processes that are performed level by level from top to bottom. The four levels are specifically as follows: level 1 is two independent analysis with high relevance, namely determining an analysis area and selecting a remote sensing data source; level 2 is remote sensing data preprocessing; level 3 and level 4 are horizontally two groups of independent analysis with certain relevance; each group is independent analysis with high relevance between upper and lower levels; respectively, group 1 is water body information extraction and impact evaluation of different research scales performed accordingly; and group 2 is channel project identification and project construction and impact tracking performed accordingly; and the specific steps of the foregoing process are as follows:

1) the step of determining an analysis area includes: determining an area where a project is located by construction bid sections and project types, and selecting a scope of revetment, shoal cutting, spur dike and submerged dike projects as an analysis area;

2) the step of selecting a remote sensing data source includes: selecting a remote sensing data source which can cover the analysis area and has a long time series, and selecting data of a same period (dry season) of the long time series;

3) the step of remote sensing data preprocessing includes: atmospheric correction and geometric correction;

4) the step of water body information extraction includes: 3.1.1 extracting water body information by using a normalized difference water index (NDWI);

5) the step of impact evaluation of different research scales includes: analyzing erosion and deposition changes based on a comparison between water body area changes in different years, analyzing shoreline changes based on overlaying of shoreline information in different years, and analyzing water body morphological changes based on description of large-scale water body morphological changes;

6) the step of channel project identification includes: performing visual identification and marking with reference to contents of revetment, shoal cutting, spur dike and submerged dike projects;

7) the step of project construction and impact tracking includes: tracking and monitoring project construction details based on tracking and monitoring of a whole process of spatio-temporal changes of project impact source terms, performing comparative analysis on project impact type and scope consistencies based on a comparison between monitoring results and environmental impact evaluation results, and evaluating project implementation effects with reference to analysis of changes of erosion and deposition, shoreline stability and water area morphology.

The schematic diagram of a process for long-term time series satellite remote sensing analysis of an ecological impact of a channel project used for describing the foregoing four-level level-by-level analysis process and steps is shown in FIG. 1.

The method for evaluating an ecological impact of a channel project at different research scales based on water body information extraction includes a water body information extraction method, an erosion and deposition change analysis method, a shoreline change analysis method and a water area morphological change analysis method, with the following specific characteristics:

1) The water body information extraction method extracts water body area and spatial distribution information by using the NDWI; and a calculation formula is NDWI= $(B_{green}-B_{Near\ IR})/(B_{green}+B_{Near\ IR})$, where $B_{green}$ is a green light wave band in a satellite remote sensing image, and $B_{Near\ IR}$ is a near infrared wave band in a satellite remote sensing image.

2) The erosion and deposition change analysis method includes an erosion and deposition analysis method, erosion and deposition condition judging criteria and an erosion and deposition area calculation formula. The erosion and deposition analysis method includes: comparing changes of long-term time series water body areas of water areas where different construction bid sections are located by using a geographic information systems (GIS) overlay analysis tool, analyzing erosion and deposition conditions of different construction bid sections in different periods by using deposition condition judging criteria, and quantitatively analyzing a deposition area by adopting the erosion and deposition area calculation formula;

3) the erosion and deposition condition judging criteria of the foregoing erosion and deposition change analysis method are as follows: if the water body area increases with the increase of the time series, it is an erosion state; if the water body area decreases with the increase of the time series, it is a deposition state; if the increase of the water body area with the time series is unchanged, it is an erosion and deposition balance state;

4) the erosion and deposition area calculation formula of the foregoing erosion and deposition change analysis method is $CYS_{i+j}=WS_{i+j}-WS_i$, where $CYS_{i+j}$ is an erosion and deposition area from an i-th period to an (i+j)-th period (it is the erosion state when $CYS_{i+j}$ is less than 0, it is the deposition state when $CYS_{i+j}$ is greater than 0, and it is the erosion and deposition balance state when the $CYS_{j+j}$ is equal to 0), and $WS_i$ and $WS_{i+j}$ are water body areas of the i-th period and the (i+j)-th period respectively;

5) the shoreline change analysis method includes: adopting a tool for converting a GIS surface file to a line file to filter shoreline distribution information according to spatial distribution data of water body areas in different years, overlapping shoreline information in different years, and analyzing changes;

6) the water area morphological change analysis method includes: selecting spatial distribution of water body areas with representative time nodes as a comparative reference, and comprehensively analyzing changes of channel water area morphology with a time scale in a large spatial scale in an analysis area with reference to field investigation data.

The method for tracking, monitoring and evaluating construction details and implementation effects based on channel project identification includes a method for visual identification of channel project contents, a project construction content tracking and monitoring method, a method for comparing project impact scope consistencies, and a project implementation effect evaluation method, with the following specific characteristics:

1) the method for visual identification of channel project contents includes: based on color synthesis of satellite remote sensing images, visually identifying and manually marking channel project contents for such project types as revetment, shoal cutting, spur dikes and submerged dikes which are easy to identify visually, with reference to specific contents of channel project construction;

2) the project construction content tracking and monitoring method includes: selecting satellite remote sensing color composite images of relevant time nodes before construction, during construction and after construction based on the foregoing method for visual identification, visually identifying and manually marking channel project contents, and tracking, monitoring and evaluating a whole process of spatio-temporal changes of project impact source items such as revetment, shoal cutting, spur dikes and submerged dikes through comparative analysis of monitoring results in different periods;

3) the method for comparing project impact scope consistencies includes: based on three stages: before construction, during construction and after construction, judging a type and range of an ecological environment impact of a project according to evaluation results of the foregoing project construction content tracking and monitoring method and an ecological environment impact mechanism, making a comparison with environmental impact evaluation results, and analyzing the consistency in type and range;

4) the project implementation effect evaluation method includes: comprehensively evaluating effectiveness and ecological rationality of channel project design by combining tracking and monitoring results of the project construction content tracking and monitoring method, consistency comparison results of the method for comparing project impact scope consistencies, and the foregoing analysis results of erosion and deposition and shoreline stability and water area morphological changes.

(3) Advantages and Effects

The present invention has the advantages that a method for tracking, monitoring and evaluating an ecological impact of a channel project based on long-term time series satellite remote sensing data includes a process for long-term time series satellite remote sensing analysis of an ecological impact of a channel project, a method for evaluating an ecological impact of a channel project at different research scales based on water body information extraction, and a method for tracking, monitoring and evaluating construction details and implementation effects based on channel project identification. According to the characteristics of a large-scale and long-term ecological impact of a channel project, it is technically feasible and economically reasonable to use long-term time series satellite remote sensing data to realize tracking and monitoring. This provides suitable, simple, feasible and economical satellite remote sensing tracking, monitoring and evaluation technical support for long-term tracking and monitoring of an ecological impact of a channel project, evaluation of an ecological environment effect of project implementation, and evaluation of effectiveness and ecological rationality of project design.

The present invention provides the method for evaluating an ecological impact of a channel project at different research scales, including a water body information extraction method, an erosion and deposition change analysis method, a shoreline change analysis method, a water area morphological change analysis method, and a method for tracking and monitoring channel project construction details and implementation effects, which includes a method for visual identification of channel project contents, a project construction content tracking and monitoring method, a method for comparing project impact scope consistencies, and a project implementation effect evaluation method. The present invention makes up for technical defects of tracking and monitoring the ecological impact of channel project construction on different time and space scales, and fills in the void of the method for tracking, monitoring and evaluating an ecological impact of a channel project based on satellite remote sensing.

DETAILED DESCRIPTION

Figure 1:
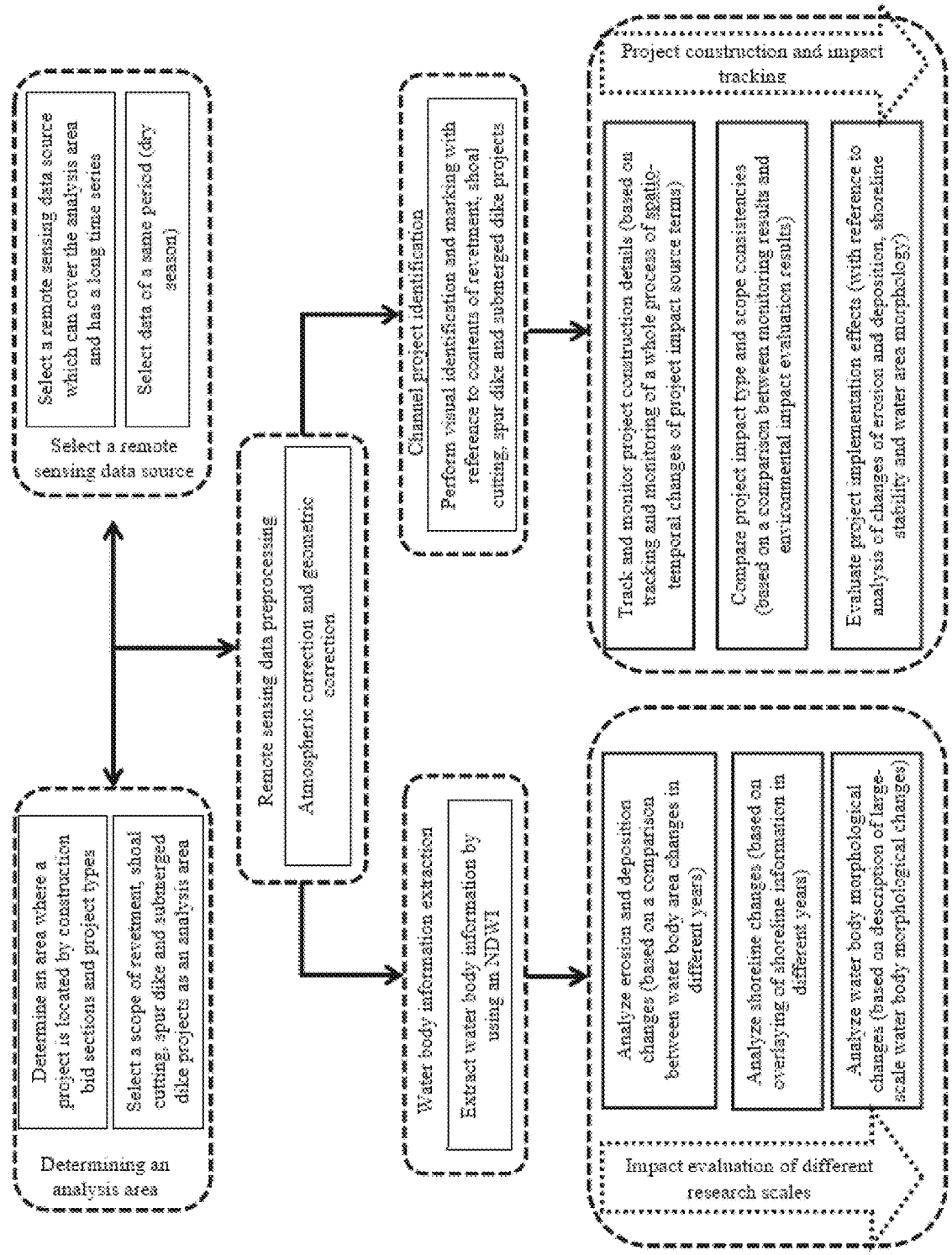
FIG. 1 is a schematic diagram of a process for long-term time series satellite remote sensing analysis of an ecological impact of a channel project.

The present invention relates to a method for tracking, monitoring and evaluating an ecological impact of a channel project based on long-term time series satellite remote sensing data. The process for long-term time series satellite remote sensing analysis of an ecological impact of a channel project includes four levels of analysis processes that are performed level by level. Level 1 is determining an analysis area and selecting a remote sensing data source; level 2 is remote sensing data preprocessing; and level 3 and level 4 are water body information extraction and impact evaluation of different research scales promoted on this basis respectively, and channel project identification and project construction and impact tracking promoted on this basis, respectively. Related analysis methods include: an analysis method for respectively evaluating erosion and deposition, shoreline and water area morphological changes at different research scales based on water body information extraction, and an analysis method for respectively tracking and monitoring engineering construction details, comparing engineering impact scope consistency and evaluating engineering implementation effects based on channel project identification. This provides suitable, simple, feasible and economical satellite remote sensing tracking, monitoring and evaluation technical method support for long-term tracking and monitoring of an ecological impact of a channel project, evaluation of an ecological environment effect of project implementation, and evaluation of effectiveness and ecological rationality of project design.

The implementation of the present invention is further described below with reference to accompanying drawings and examples.

Case project: phase II of a 12.5 m deep-water channel of the Yangtze River downstream Nanjing.

An analysis area was determined: phase II of a 12.5 m deep-water channel of the Yangtze River downstream Nanjing covers a 227 km section from Nantong to Nanjing of the Yangtze River. Channel regulation project types include dredging, shore cutting, damming (spur dikes, submerged dikes, and the like), bottom protection laying and revetment. Four key construction sections, namely, a Fujiangsha reach, a Kouanzhi reach, a Hechangzhou reach and a Shiyezhou reach, were selected for satellite remote sensing monitoring. In combination with the types of channel regulation projects, the satellite remote sensing monitoring selected project types that are easy to identify visually, including revetment, shoal cutting, spur dike and submerged dike projects as analysis areas.

Remote sensing image data sources were selected: Four kinds of optical satellite remote sensing data were mainly used, namely MSS, TM, ETM and OLI_TRIS data of Landsat series of the United States. This case study acquired and processed remote sensing image data of a reach of a phase II project for more than 40 years from the mid-1970s to the recent period (2015-2017). The data was collected in six stages, namely, the mid-1970s, early 1980s, early 1990s, 2000, around 2010, and the construction period of the project from 2015 to 2017. The data of the same period of the year (dry season) was selected, as shown in Table 1.

TABLE 1

Remote sensing image data source of a reach of phase II of a 12.5 m deep-water channel of the Yangtze River downstream Nanjing

| S/N | Image shooting time | Optical sensor type | Number of images | Spatial resolution (m) |
|---|---|---|---|---|
| 1 | Mid-1970s | MSS | 3 | 78 |
| 2 | Early 1980s | MSS | 6 | 80 |
| 3 | Early 1990s | TM | 4 | 30 |
| 4 | 2000 | ETM | 6 | 30/15 |
| 5 | 2010 | TM | 4 | 30 |
| 6 | 2015 to 2017 | OLI | 6 | 30/15 |

The remote sensing data preprocessing includes geometric correction and registration, atmospheric correction, image mosaic and band fusion, which can be realized by ENVI5.2 remote sensing data processing software.

Water body information extraction: It is implemented by the NDWI of ENVI5.2 software.

Figure 2:
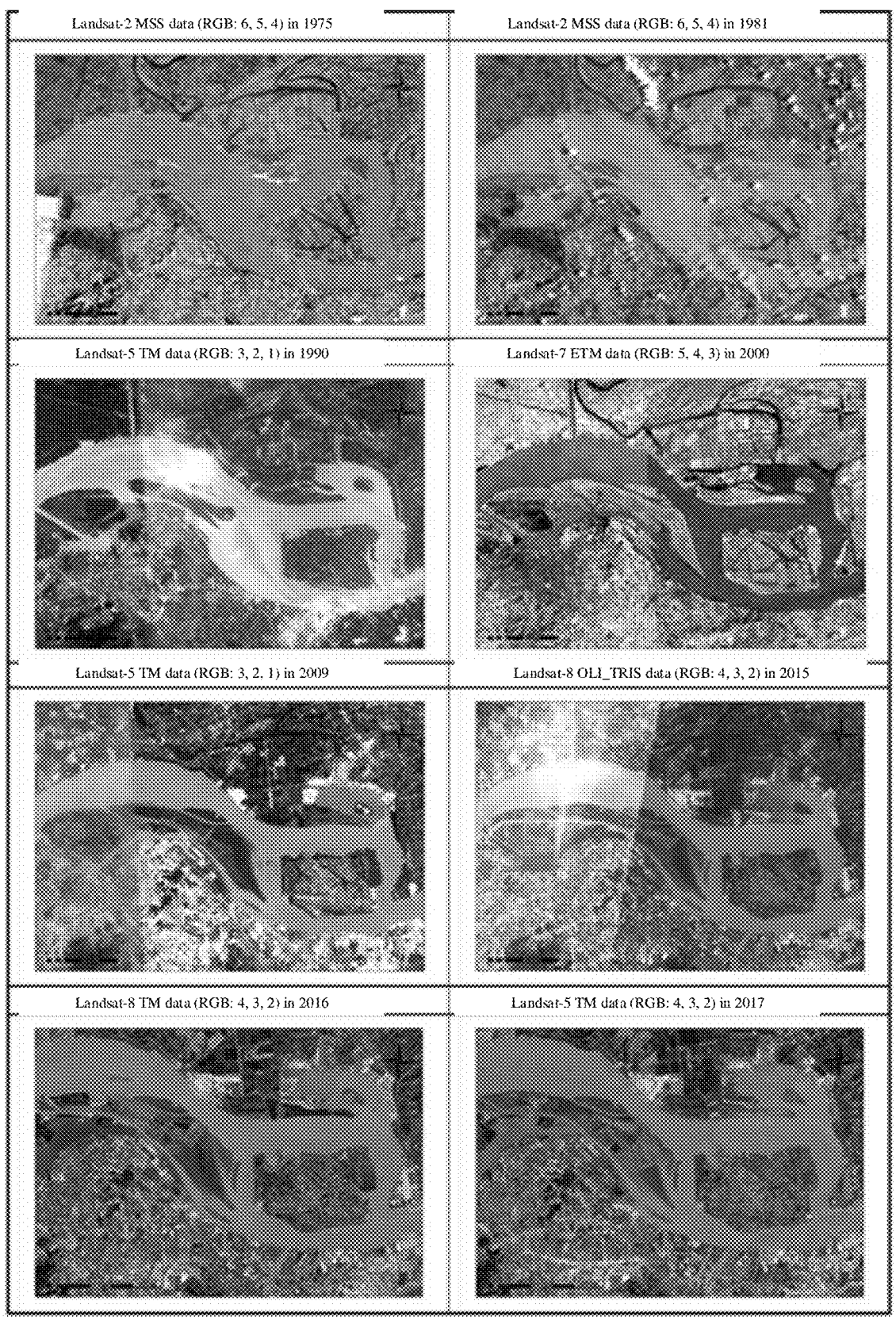
FIG. 2 shows remote sensing monitoring and analysis of a Hechangzhou reach of phase II of a 12.5 m deep-water channel of the Yangtze River downstream Nanjing from 1975 to 2017.
Figure 3:
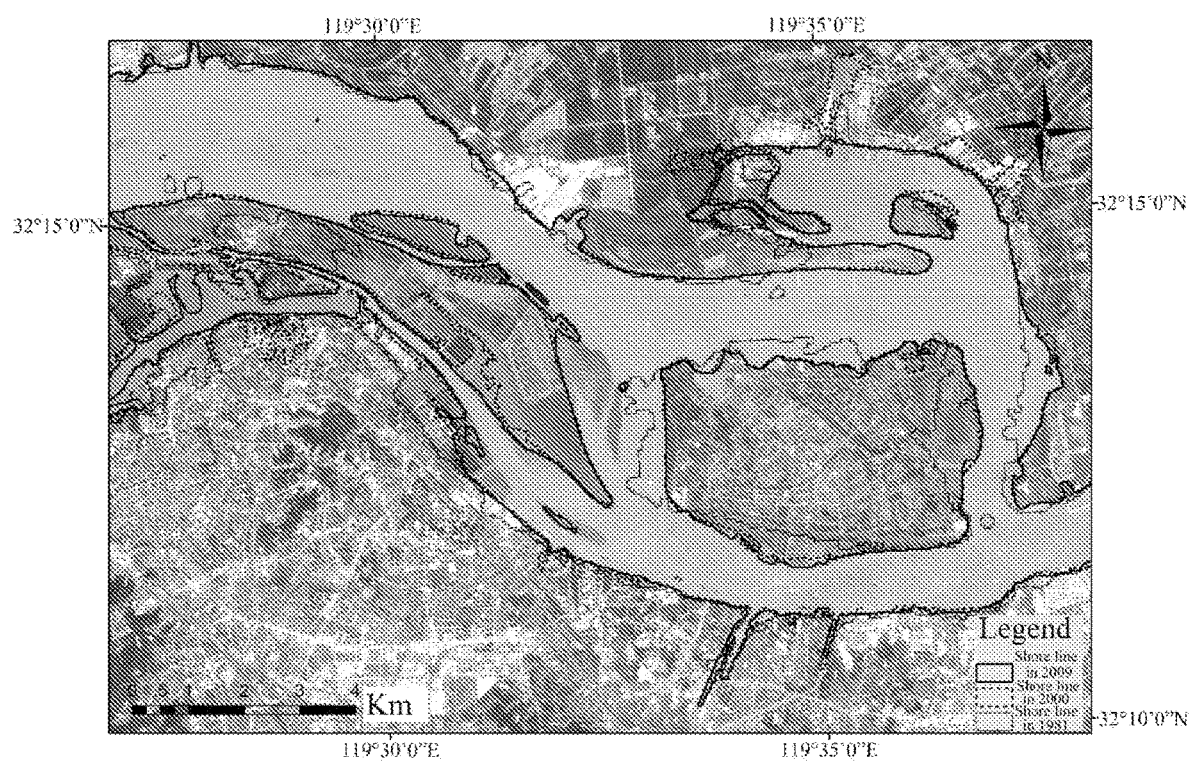
FIG. 3 shows analysis of shoreline changes of a Hechangzhou reach of phase II of a 12.5 m deep-water channel of the Yangtze River downstream Nanjing from 1981 to 2015.
Figure 4:
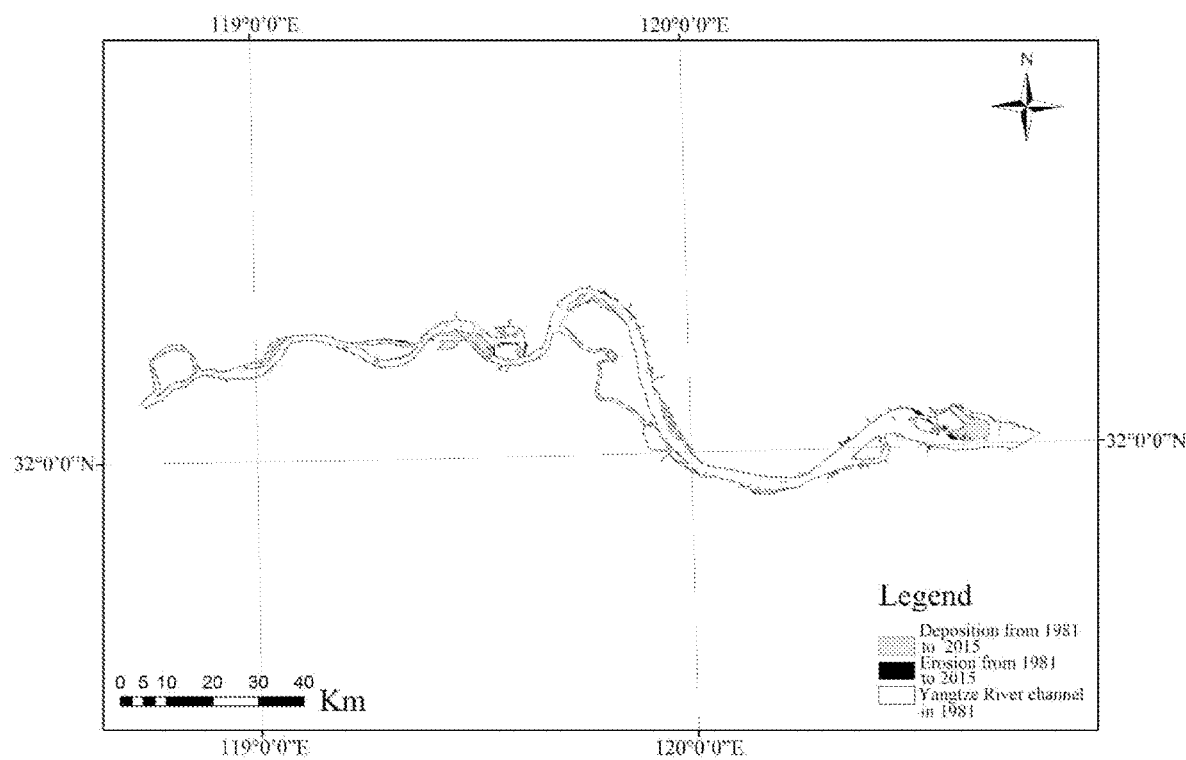
FIG. 4 shows water area morphological change analysis of a reach of phase II of a 12.5 m deep-water channel of the Yangtze River downstream Nanjing from 1981 to 2015.

Impact evaluation of different research scales: It includes erosion and deposition changes, shoreline changes and water area morphological analysis. Taking the Hechangzhou reach as an example, the Yangtze River, about 10 km downstream Zhenjiang, is divided into two branches in the north and south by Hechangzhou. In history, the Hechangzhou River regime has changed dramatically. This case collected remote sensing image data of Hechangzhou reach for more than 40 years from the mid-1970s to 2017, and performed comparative analysis in eight periods. Before the 1990s, the main channel of the Yangtze River was located in the south branch and the north branch was in a silted state. After the 1990s, the north branch gradually became the main channel and the south branch gradually silted up (see FIG. 2 for details). The shoreline change of Hechangzhou reach from 1981 to 2015 also indicates this change trend (see FIG. 3 for details). During the 35 years from 1981 to 2015, the channel water area of the reach of the Phase II project of the Yangtze River decreased by 82.02 km$^2$, where the water area decreased by 26.93 km$^2$ from 1981 to 2000, with an average annual decrease of 1.42 km$^2$, and the water area decreased by 55.09 km$^2$ from 2000 to 2015, with an average annual decrease of 3.67 km$^2$. The water area morphological changes of the Hechangzhou reach and the Fujiangsha reach were the most significant, mainly dominated by deposition, while the rest of the reaches were not changed much in 35 years and remained basically stable (see FIG. 4 for details).

Figure 5:
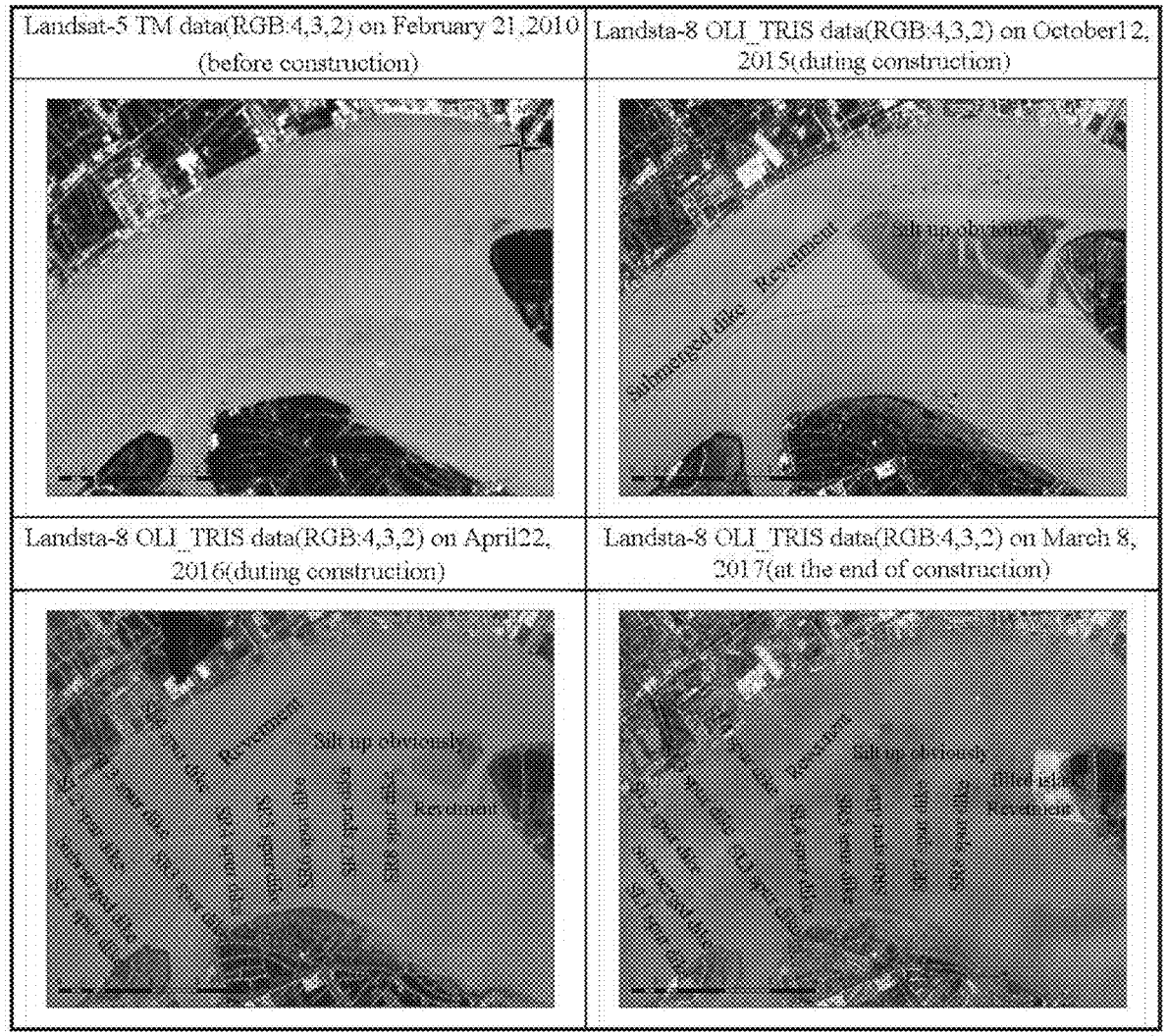
FIG. 5 shows construction and impact tracking analysis of a Fujiangsha reach of phase II of a 12.5 m deep-water channel of the Yangtze River downstream Nanjing.

Regulation project identification: Taking the Fujiangsha reach as an example, types of channel regulation projects were visually identified with reference to the construction details of revetment, spur dike and submerged dike projects (see FIG. 5 for details).

Project construction and impact tracking: It includes project construction content tracking and monitoring, comparison between project impact types and scope consistencies, and evaluation of project implementation effects. Taking the Fujiangsha reach as an example, by combining the implementation progress of the phase II project, four phases of remote sensing data (Landsat-5™ data and Landsat-8 OLI_TRIS data) were obtained, namely, data on Feb. 21, 2010 (before construction), Oct. 12, 2015 (during construction), Apr. 22, 2016 (during construction) and Mar. 8, 2017 (at the end of construction) (see FIG. 5 for details), respectively. The 12.5 m deep-water channel construction solution in the study area was one-way in Fuzhong+one-way in Fubei, and the channel design width was 260 m. The construction of Fuchangsha channel includes: building a 3150-meter-long submerged dike near a sand ridge line of the Shuangjiansha head; building four spur dikes with a length of 510-1000 m on the north side of a head submerged dike; building three spur dikes with a length of 250-550 m on the south side of the head submerged dike; and building five spur dikes with a length of 400-425 m at revetments on the south side of Shuangjiansha. According to remote sensing monitoring, as of Apr. 22, 2016, the 3150-meter submerged dike at the head of Shuangjiansha, the revetments on both sides, and the spur dikes on the north and south sides of Shuangjiansha were basically completed. Satellite remote sensing monitoring realizes the tracking and monitoring of the whole process of channel regulation project construction in the Fujiangsha reach. Monitoring results show that the project impact scope conforms to the prediction scope of environmental impact evaluation. The construction of the project has good practical effects on the shoreline stability, the balance bewteen erosion and deposition and the stability of water body morphology.

What is claimed is:

1. A method for tracking, monitoring and evaluating an ecological impact of a channel project based on long-term time series satellite remote sensing data, comprising:
   processing long-term time series satellite remote sensing analysis of an ecological impact of a channel project,
   evaluating an ecological impact of the channel project at different research scales based on water body information extraction, and
   tracking, monitoring and evaluating construction details and implementation effects based on channel project identification, wherein
   processing the long-term time series satellite remote sensing analysis of the ecological impact of the channel project comprises:
   2.1 performing four levels of analysis processes level by level from top to bottom, wherein the four levels are specifically as follows: level 1 is two independent analysis with high relevance, namely determining an analysis area and selecting a remote sensing data source; level 2 is remote sensing data preprocessing;

level 3 and level 4 are horizontally two groups of independent analysis with certain relevance; each group is independent analysis with high relevance between upper and lower levels; respectively, group 1 is the water body information extraction and impact evaluation of different research scales performed accordingly; and group 2 is the channel project identification and project construction and impact tracking performed accordingly;

2.2 the specific steps of the analysis process are as follows:

2.2.1 the step of determining the analysis area comprises: determining an area where a project is located by construction bid sections and project types, and selecting a scope of revetment, shoal cutting, spur dike and submerged dike projects as the analysis area;

2.2.2 the step of selecting the remote sensing data source comprises: selecting the remote sensing data source which can cover the analysis area and has a long time series, and selecting data of a same period (dry season) of the long time series;

2.2.3 the step of the remote sensing data preprocessing comprises: atmospheric correction and geometric correction;

2.2.4 the step of the water body information extraction comprises: extracting water body information by using a normalized difference water index (NDWI);

2.2.5 the step of the impact evaluation of the different research scales comprises: analyzing erosion and deposition changes based on a comparison between water body area changes in different years, analyzing shoreline changes based on overlaying of shoreline information in different years, and analyzing water body morphological changes based on description of large-scale water body morphological changes;

2.2.6 the step of the channel project identification comprises: performing visual identification and marking with reference to contents of revetment, shoal cutting, spur dike and submerged dike projects; and 2.2.7 the step of the project construction and impact tracking comprises: tracking and monitoring project construction details based on tracking and monitoring of a whole process of spatio-temporal changes of project impact source terms, performing comparative analysis on project impact type and scope consistencies based on a comparison between monitoring results and environmental impact evaluation results, and evaluating project implementation effects with reference to analysis of changes of erosion and deposition, shoreline stability and water area morphology.

2. The method for tracking, monitoring and evaluating the ecological impact of the channel project based on the long-term time series satellite remote sensing data according to claim 1, wherein evaluating the ecological impact of the channel project at the different research scales based on the water body information extraction comprises:

3.1 a water body information extraction method, an erosion and deposition change analysis method, a shoreline change analysis method and a water area morphological change analysis method;

3.2 the specific evaluation methods have the following characteristics:

3.2.1 the water body information extraction method comprises: extracting water body area and spatial distribution information by using a normalized difference water index (NDWI);

3.2.2 the erosion and deposition change analysis method comprises an erosion and deposition analysis method, erosion and deposition condition judging criteria and an erosion and deposition area calculation formula, and the specific contents are as follows:

3.2.2.1 the erosion and deposition analysis method comprises: comparing changes of long-term time series water body areas of water areas where different construction bid sections are located by using a geographic information systems (GIS) overlay analysis tool, analyzing erosion and deposition conditions of different construction bid sections in different periods by using deposition condition judging criteria, and quantitatively analyzing a deposition area by adopting the erosion and deposition area calculation formula;

3.2.2.2 the erosion and deposition condition judging criteria are as follows: if the water body area increases with the increase of the time series, it is an erosion state; if the water body area decreases with the increase of the time series, it is a deposition state; if the increase of the water body area with the time series is unchanged, it is an erosion and deposition balance state;

3.2.2.3 the erosion and deposition area calculation formula is $CYS_{i+j}=WS_{i+j}-WS_i$, wherein $CYS_{i+j}$ is an erosion and deposition area from an i-th period to an (i+j)-th period (it is the erosion state when $CYS_{i+j}$ is less than 0, it is the deposition state when $CYS_{i+j}$ is greater than 0, and it is the erosion and deposition balance state when the $CYS_{i+j}$ is equal to 0), and $WS_i$ and $WS_{i+j}$ are water body areas of the i-th period and the (i+j)-th period respectively;

3.2.3 the shoreline change analysis method comprises: adopting a tool for converting a GIS surface file to a line file to filter shoreline distribution information according to spatial distribution data of water body areas in different years, overlapping shoreline information in different years, and analyzing changes;

3.2.4 the water area morphological change analysis method comprises: selecting spatial distribution of water body areas with representative time nodes as a comparative reference, and comprehensively analyzing changes of channel water area morphology with a time scale in a large spatial scale in an analysis area with reference to field investigation data.

3. The method for tracking, monitoring and evaluating the ecological impact of the channel project based on the long-term time series satellite remote sensing data according to claim 1, wherein tracking, monitoring and evaluating the construction details and implementation effects based on the channel project identification comprises:

4.1 a method for visual identification of channel project contents, a project construction content tracking and monitoring method, a method for comparing project impact scope consistencies, and a project implementation effect evaluation method;

4.2 the specific evaluation methods have the following characteristics:

4.2.1 the method for visual identification of channel project contents comprises: based on color synthesis of satellite remote sensing images, visually identifying and manually marking channel project contents for such project types as revetment, shoal cutting, spur dikes and submerged dikes which are easy to be visually identified, with reference to specific contents of channel project construction;

4.2.2 the project construction content tracking and monitoring method comprises: selecting satellite remote sensing color composite images of relevant time nodes before construction, during construction and after construction based on the method for visual identification of channel project contents, visually identifying and manually marking channel project contents, and tracking, monitoring and evaluating a whole process of spatio-temporal changes of project impact source items including revetment, shoal cutting, spur dikes and submerged dikes through comparative analysis of monitoring results in different periods;

4.2.3 the method for comparing project impact scope consistencies comprises: based on three stages: before construction, during construction and after construction, judging a type and range of an ecological environment impact of a project according to evaluation results of the project construction content tracking and monitoring method and an ecological environment impact mechanism, making a comparison with environmental impact evaluation results, and analyzing the consistency in type and range;

4.2.4 the project implementation effect evaluation method comprises: comprehensively evaluating effectiveness and ecological rationality of channel project design by combining tracking and monitoring results of the project construction content tracking and monitoring method, consistency comparison results of the method for comparing project impact scope consistencies, and the analysis results of erosion and deposition and shoreline stability and water area morphological changes obtained in accordance with an erosion and deposition change analysis method, a shoreline change analysis method and a water area morphological change analysis method in a same area.

* * * * *